(12) United States Patent
Kossoff

(10) Patent No.: US 10,107,478 B1
(45) Date of Patent: Oct. 23, 2018

(54) LIGHT ASSEMBLY

(71) Applicant: The Retrofit Source, Inc., Atlanta, GA (US)

(72) Inventor: Matt Kossoff, Atlanta, GA (US)

(73) Assignee: The Retrofit Source, Inc., Atlanta, GA (US)

( * ) Notice: Subject to any disclaimer, the term of this patent is extended or adjusted under 35 U.S.C. 154(b) by 2 days.

(21) Appl. No.: 15/377,172

(22) Filed: Dec. 13, 2016

Related U.S. Application Data

(60) Provisional application No. 62/268,688, filed on Dec. 17, 2015.

(51) Int. Cl.

| | |
|---|---|
| *F21V 3/12* | (2018.01) |
| *F21V 13/12* | (2006.01) |
| *F21V 3/02* | (2006.01) |
| *F21V 7/22* | (2018.01) |
| *G02B 27/10* | (2006.01) |
| *F21V 29/70* | (2015.01) |
| *F21V 9/30* | (2018.01) |
| *F21S 41/20* | (2018.01) |
| *F21V 3/06* | (2018.01) |
| *F21S 41/30* | (2018.01) |

(Continued)

(52) U.S. Cl.
CPC ............ *F21V 13/12* (2013.01); *F21S 41/285* (2018.01); *F21S 41/30* (2018.01); *F21S 45/47* (2018.01); *F21V 3/02* (2013.01); *F21V 3/0615* (2018.02); *F21V 3/12* (2018.02); *F21V 7/22* (2013.01); *F21V 9/30* (2018.02); *F21V 29/70* (2015.01); *G02B 27/10* (2013.01); *F21Y 2115/30* (2016.08)

(58) Field of Classification Search
CPC ........ F21V 13/12; F21V 3/0481; F21V 29/70; F21V 3/0427; F21V 7/22; F21V 9/16; F21V 3/02; F21S 48/328; F21S 48/13; F21S 48/1225; G02B 27/10; F21Y 2115/30

See application file for complete search history.

(56) References Cited

U.S. PATENT DOCUMENTS

| | | | |
|---|---|---|---|
| 4,546,417 A | * | 10/1985 | Watts ...................... F21K 99/00 362/84 |
| 5,809,796 A | | 9/1998 | Zakryk |

(Continued)

OTHER PUBLICATIONS

Taylor, "BMW's piercing laser headlights", Motoring.com, 2014, pp. 1-6, www.motoring.com.au/news/2014/prestige-and-luxury/bmw/bmws-piercing-laser-headlights/ accessed Sep. 21, 2015.

(Continued)

*Primary Examiner* — Y M. Lee

(74) *Attorney, Agent, or Firm* — MacMillan, Sobanski & Todd, LLC

(57) ABSTRACT

A light assembly includes a laser light emitting diode for emitting a light beam along an axis and a diffusing assembly for deflecting the light beam substantially 360 degrees around the axis. The diffusing assembly includes a light diffuser for receiving and scattering a light beam emitted from the diode, a phosphor tube for further scattering the light emitted from the diffuser, and a mirror for returning any light with is not deflected radially through the phosphor tube back into the phosphor tube. The deflector has a reflective end surface to allow the light repeated passes thorough the phosphor tube until it escapes radially through the tube.

14 Claims, 5 Drawing Sheets

(51) Int. Cl.
   *F21S 45/47* (2018.01)
   *F21Y 115/30* (2016.01)

(56) References Cited

U.S. PATENT DOCUMENTS

| | | | |
|---|---|---|---|
| 8,494,321 B2 | 7/2013 | Herden et al. | |
| 8,761,222 B2 | 6/2014 | Stoppel et al. | |
| 8,851,694 B2 * | 10/2014 | Harada | F21V 9/16 362/259 |
| 9,065,240 B2 | 6/2015 | Seidel et al. | |
| 2008/0285284 A1 * | 11/2008 | Feiereisen | F21S 8/00 362/290 |
| 2010/0277926 A1 * | 11/2010 | Wen | F21V 3/02 362/311.02 |
| 2011/0058358 A1 * | 3/2011 | Soo | F21V 7/0058 362/249.01 |
| 2011/0216552 A1 * | 9/2011 | Hattori | F21K 9/232 362/553 |
| 2012/0044566 A1 | 2/2012 | Hsieh | |
| 2012/0275180 A1 * | 11/2012 | Button | G02B 6/001 362/558 |
| 2013/0058080 A1 * | 3/2013 | Ge | F21V 29/70 362/249.06 |
| 2013/0182410 A1 * | 7/2013 | Gibson | F21V 9/16 362/84 |
| 2015/0176770 A1 * | 6/2015 | Wilcox | F21K 9/27 362/224 |
| 2016/0047515 A1 * | 2/2016 | Stone | F21K 9/56 362/553 |
| 2016/0084461 A1 * | 3/2016 | Nakamura | F21S 48/1145 362/510 |

OTHER PUBLICATIONS

Wasef, "How it Works: The BMW i8's Laser Headlights", Popular Mechanics, 2014, pp. 1-6, http://www.popularmechanics.com/cars/a10841/how-it-works-the-bmw-i8s-laser-headlights-16905044/ accessed Sep. 21, 2015.

* cited by examiner

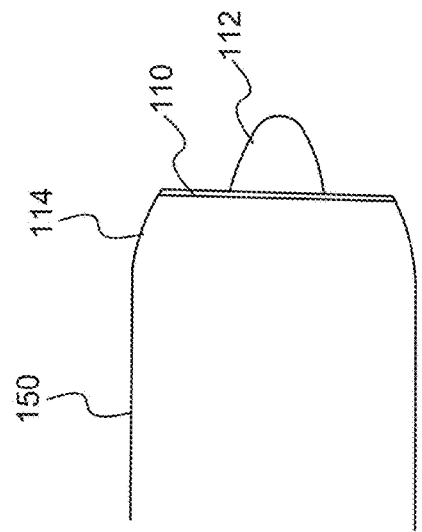
FIG. 4
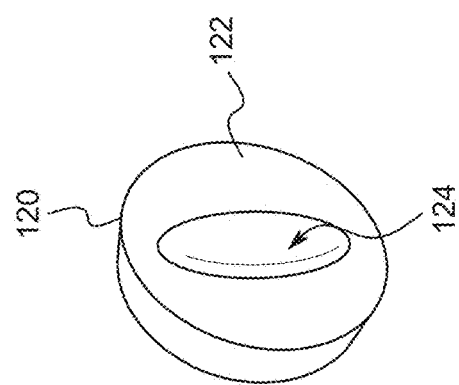
FIG. 5B
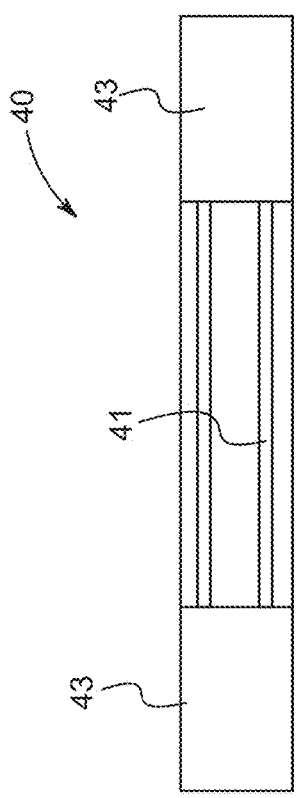
FIG. 3
FIG. 5A

LIGHT ASSEMBLY

REFERENCE TO RELATED APPLICATIONS

This application claims priority from U.S. Provisional Application Ser. No. 62/268,688, filed Dec. 17, 2015, the disclosures of which are hereby incorporated by reference.

FIELD OF THE INVENTION

The present invention generally relates to light assemblies and more particularly to light assemblies having laser diodes.

BACKGROUND OF THE INVENTION

Many types of lighting systems have been used especially for vehicle lighting applications. For example, high intensity discharge or halogen bulbs have been used for vehicle headlight systems. These bulbs are capable of illuminating the entire surface of a parabolic/concave headlight reflector, which is an advantage over the directional light created by LED bulbs.

Laser diode lighting has also been used in vehicle applications. Laser diodes typically emit a light beam along a single axis. Typical laser diode light systems use a flat plate lined with phosphor that will emit light in a single direction once excited by the laser. These systems are adequate for certain lighting applications, such as vehicle headlights. However, single direction systems pose certain design limitations compared to systems capable of producing near 360 degrees of light.

It would be advantageous for certain lighting applications to have a laser diode light system which deflects light emitted from a laser diode in multiple directions relative to the initial light beam, especially radially relative to the initial light beam axis.

SUMMARY OF THE INVENTION

The present invention is a light assembly including a laser light emitting diode for emitting a light beam along an axis and a diffusing assembly for deflecting the light beam in multiple radial directions, including substantially 360 degrees around the initial light beam axis. The diffusing assembly may include a light diffuser for receiving and scattering a light beam emitted from the diode, a phosphor tube for further scattering the light emitted from the diffuser, and a mirror for returning any light which is not deflected radially through the phosphor tube back into the phosphor tube. The deflector preferably has a reflective end surface to allow the laser beam repeated passes thorough the phosphor tube until it escapes radially through the tube.

BRIEF DESCRIPTION OF THE DRAWINGS

FIG. 3 is a cross-sectional view of the phosphor tube of FIGS. 1 and 2.

FIG. 4 is a plan view of the top portion of the diffuser of FIG. 1.

FIGS. 5A-B are perspective views alternate top surfaces of the diffuser of FIG. 4.

DESCRIPTION OF PREFERRED EMBODIMENTS

Figure 1:
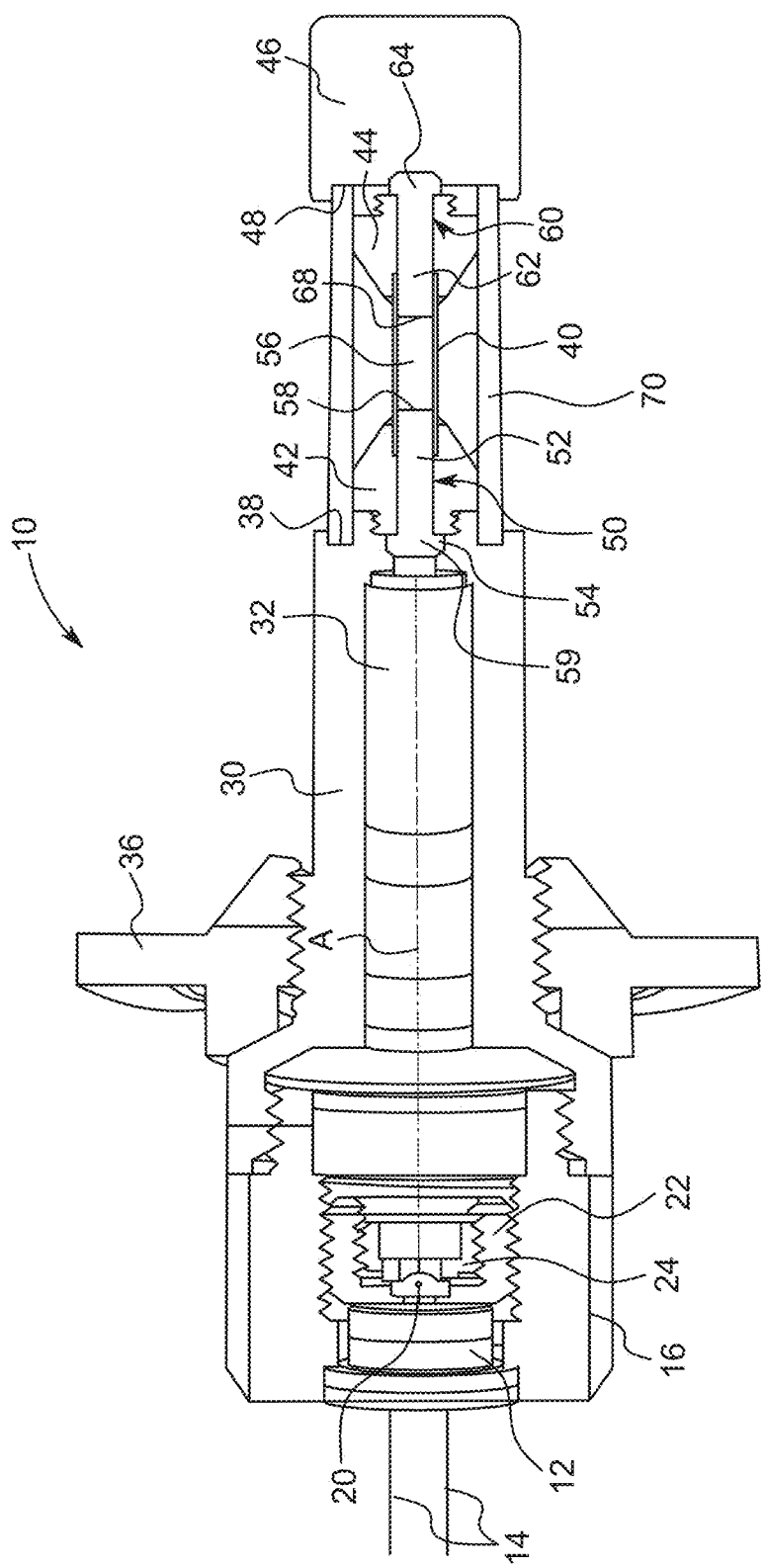
FIG. 1 is a cross-sectional view of the light assembly of the present invention.
Figure 2:
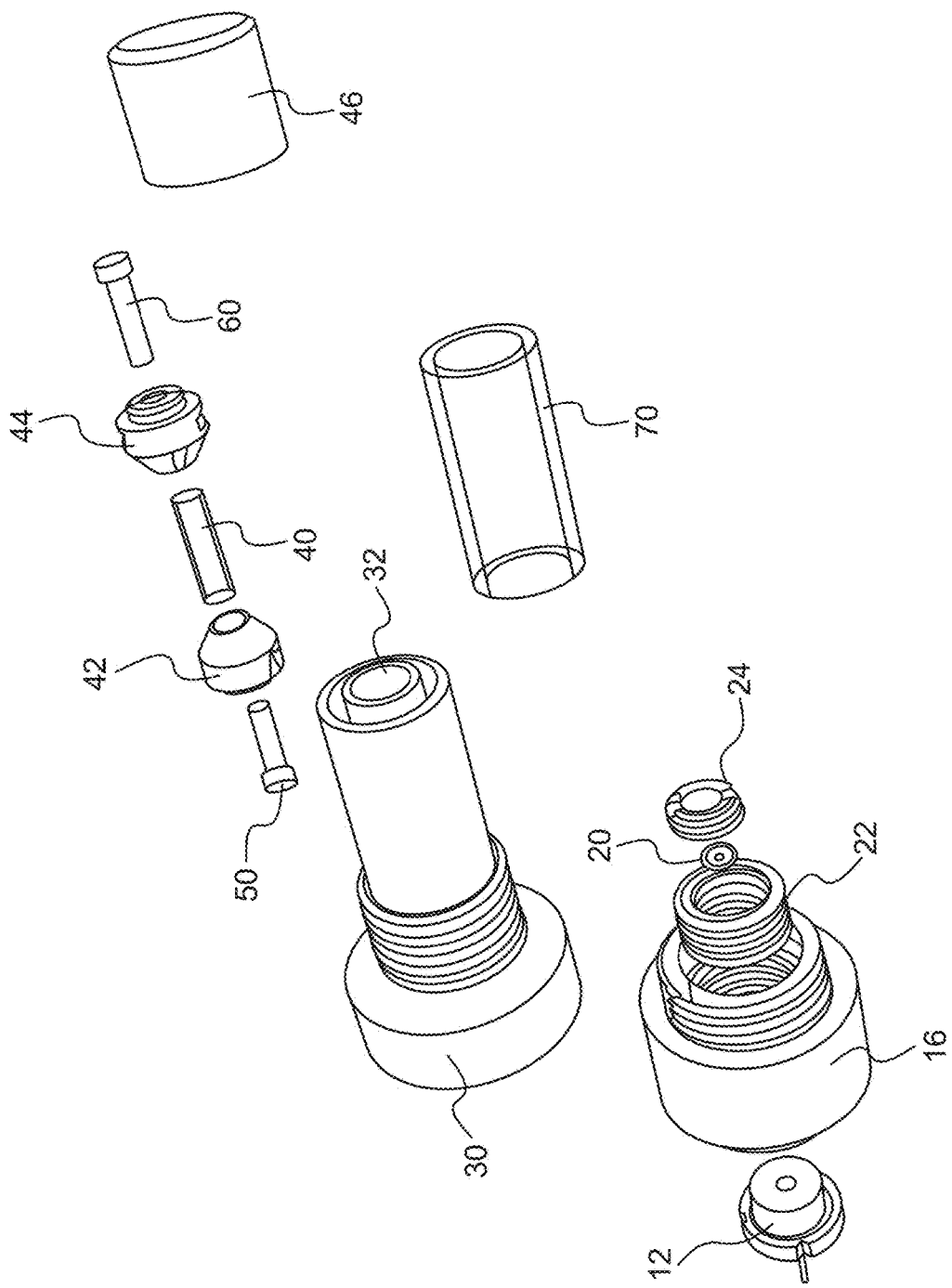
FIG. 2 is an exploded view of the light assembly of FIG. 1.

Referring to FIGS. 1 and 2, a light assembly 10 includes a laser diode 12, such as one commonly designated NUMB44, which emits a single light beam along an axis A. Laser diode 12 is readily commercially available packaged in a copper module with electrical leads 14. The diode 12 is mounted in a core base 16 which acts as a heat sink. The core base is preferably copper but numerous other materials may be used.

A glass lens 20 is mounted in a lens holder 22 and lens retainer 24. The lens 20, holder 22 and retainer 24 are threadingly mounted in the core base 16. A metal core upper 30 threadingly mates with the core base 16. The core upper 30 includes a hollow stepped cylindrical channel 32 providing a light beam passageway. A metal mounting base 36 (not shown in FIG. 2) threadingly engages the core upper 30 for mounting the assembly 10. The base 36 can be designed for compatibility with different applications.

An axially extending ceramic phosphor tube or pipe 40 is secured at each end by metal holders 42 and 44, respectively. Bottom holder 42 threadingly engages the end of the core upper 30. Top holder 44 threadingly engages a metal assembly top 46.

A light diffuser 50 is positioned adjacent the core upper 30 and secured by the bottom holder 42. The diffuser 50 has an elongated cylindrical shaft 52 which extends through the holder 42 and into an end of the phosphor tube 40. The diffuser 50 has a top surface 58 and cylindrical head 54 which secures the diffuser between the core upper 30 and the holder 42. The bottom surface 59 is flat or planar and has an anti-reflective (AR) coating to reduce reflection for maximum efficiency. The diffuser is clear and precisely made, either molded or ground entirely out of an optical grade plastic or glass such that the laser light easily passes through. The length of the diffuser 50 is about half that of the tube 40.

In a similar manner, a mirror 60 is positioned adjacent the assembly top cap 46 and is held in position by the top holder 44. The mirror is formed entirely from metal such as aluminum or a metal alloy. Although the component shape is not critical, the mirror 60 has an overall shape similar to diffuser 50, with a cylindrical shaft 62 having a bottom surface 68 and a cylindrical head 64. The cylindrical head 64 is secured between the top cap 46 and top holder 44. A cylindrical gap 56 exists within the phosphor tube 40 between the diffuser end surface 58 and the mirror end surface 68.

The end or bottom surface 68 is polished to a high efficiency mirror finish. The surface 68 may be flat, slightly concave, or configured otherwise as will be disclosed herein. Alternatively, the mirror could be a cap having a mirror surface adjacent the end of the tube 40, for example, the underside of the top cap 46 with a reflective or mirror surface.

A protective clear cylindrical Quartz glass sleeve 70 is mounted in annular grooves 38 and 48 in the core upper 30 and top cap 46, respectively. The sleeve 70 is secured in place by the core upper 30 and top cap 46 and surrounds the phosphor tube 40 and tube holders 42 and 44. Quartz glass is preferred because of its high clarity and the ability to contain UV light, which can be harmful to reflectors, such as headlight reflectors, over time.

Phosphor Tube

Referring to FIG. 3, the phosphor tube or pipe 40 is a glass tube with the internal cylindrical surface coated with a phosphor layer 41. Ceramic phosphor, such Phoscera brand available from Osram, is presently preferred because of its ability to handle the high heat produced in light bulb applications. Other chemicals or compositions may become commercially available and suitable for use in place of phosphor.

The cylindrical external end portions of the tube 40 are covered with masks 43 which facilitate mounting to the tube 40 within the bottom holder 42 and top holder 44. The masks 43 also prevent light from escaping the tube from locations other than the area between the masks. Preferably, the masks 43 are opaque ceramic coatings, commonly used in automotive light bulb applications, precisely sprayed or otherwise applied to the outer surface of the tube 40. Of course, the masks may be eliminated in certain designs if the tube ends are hidden or blocked by the holders 42 and 44, or by other components which prevent light from escaping radially from the tube ends.

The outer cylindrical surface of the tube 40 is textured. The inner surface may also be textured. Numerous textures and patterns may be used, such as Fresnel, micro-fluted or random patterns. Various well known methods may be used to produce the textures or patterns, such as micro-laser etching, molding, machining etc.

Diffuser Top Surface Configurations

The top surface 58 of the diffuser 50 and the opposing bottom surface 68 of the mirror 60 are generally flat. However, alternative surface configurations may be preferred to disperse light rays more effectively. For example, FIG. 4 shows an alternative diffuser 150 having a frusto-conical end portion 114 and a top surface defining a concave outer rim 110 and a generally conical protuberance 112 extending from the center of concave rim. This modified dome configuration fits snuggly within the ceramic phosphor tube 40 and emits light rays in a 360 degree scattered pattern to excite the entire length and 360 degree surface of the phosphor tube.

FIG. 5A is an alternative diffuser top surface 120 having a generally flat annular radially outer surface 122 and a concave generally elliptical shaped depression 124. FIG. 5B is an alternative diffuser top surface 130 having a generally flat annular radially outer surface 132 and a generally elliptically shaped protuberance 136 extending outwardly from the surface 132. The top surface 134 of the protuberance 136 is concave.

Mirror Surface Configurations

Figure 7:
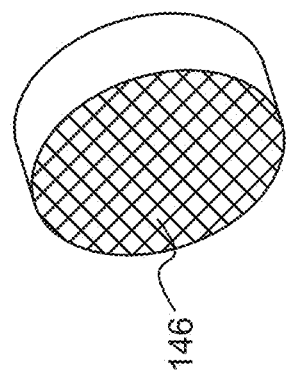
FIG. 7 is a perspective view of an alternative bottom surface of the mirror of FIG. 6.
Figure 6:
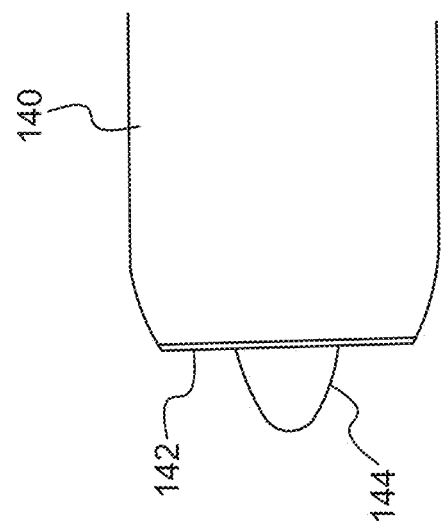
FIG. 6 is a plan view of the bottom portion of the mirror of FIG. 1.

FIG. 6 is an alternative mirror 140 having a bottom surface defining a concave outer rim 142 and a generally conical protuberance 144 extending from the center of concave rim. FIG. 7 is an alternative mirror bottom surface 146. The surface 146 is generally flat, but includes a light dispersing pattern such as a Fresnel pattern. Numerous other light dispersing patterns may be used for various light assembly applications.

Operation

In operation, a single beam of light emitted from a diode 12 enters the diffuser 50 and is refracted by the top surface 58 as it exits the diffuser. Light emitted from the diffuser 50 is deflected along the entire inside surface of the ceramic phosphor tube 40, exciting the phosphor and, causing it to glow intensely and convert blue laser light from a NUMB44 diode into over 1000 lumens of white light. Any light which passes through the tube 40 without being radially redirected will hit the mirror surface 68 and be recycled or reflected back into the phosphor tube 40 to be radially redirected. Any light passing through the tube 40 a second time will hit the reflective surface 58 of the diffuser and again be redirected back into the tube 40. This process continues until the light passes radially through the tube 40.

The ceramic phosphor tube 40 will produce a full 360 degrees of light projecting radially around the light beam axis A, making the light more "harness-able" by various styles of vehicle headlights and giving the bulb the ability to illuminate the entire surface of a parabolic/concave headlight reflector.

Vehicle Headlight Assembly

Figure 8:
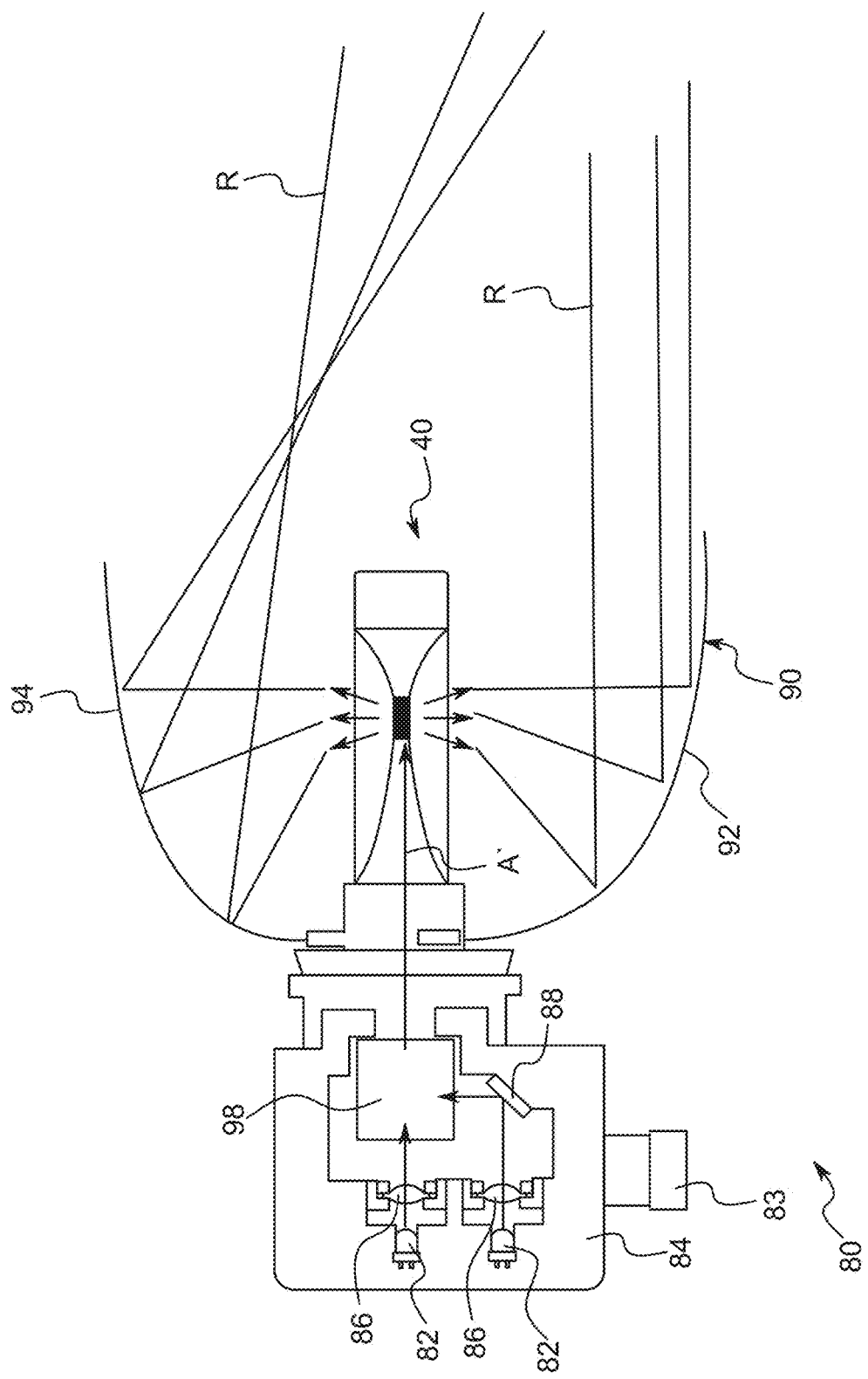
FIG. 8 is a schematic representation of a light assembly of the present invention incorporated into a vehicle headlight assembly.

The laser diode assembly 10 of the present invention can be used in various lighting applications. For example, FIG. 8 is a vehicle headlight assembly 80 including two blue laser diodes 82 mounted in a heat sink 84. Aluminum is the preferred heat sink material, but other known materials may be used. A light assembly having two diodes 82 is illustrated for purposes of this disclosure, but it will be understood by those skilled in the art that the present invention is equally applicable for light assemblies having additional diodes, lenses and mirrors.

Electrical power is provided to the system through a power inlet 83 by the vehicle's electrical system to power the laser and its associated components, again as is well known in the art. The laser also may be powered or regulated by as driver located remotely inside or outside of the headlight. The headlight assembly includes a typical vehicle headlamp reflector 90 that may be part of a full reflector system or projector-based headlamp system. As shown in the schematic diagram of FIG. 8, the bottom portion 92 of the reflector 90 is designed to reflect light rays R emitting from the radial light source in a direction substantially parallel to the beam axis A', while the top portion 94 illustrates that the reflector may be designed to reflect light rays R in various non-parallel directions depending on its primary function (i.e. low or high beam).

Light emitted from each of the two diodes 82 passes through a lens 86 to sharply focus the light stream. Light is then combined into substantially a single beam by a mirror 88 and a beam combiner 98. The combiner 98 may include one or more optical prisms or combining mirrors (not shown). Light emitting from the beam combiner 98 is directed along a beam axis A' to a light diffusing assembly 40.

The descriptions of specific embodiments of the invention herein are intended to be illustrative and not restrictive. The invention may be practiced otherwise than as specifically explained and illustrated without departing from its spirit or scope as defined by the appended claims.

What is claimed is:

1. A light assembly comprising a laser diode for emitting a light beam along an axis, a diffusing assembly for deflecting the light beam generally radially outwardly from the axis in multiple directions, and a lens positioned on the axis adjacent the laser diode, the lens axially spaced from the diffusing assembly, the diffusing assembly comprising:

an axially extending diffuser having a light entrance end and a light emitting end, the light emitting end having a reflective light diffusing surface, an axially extending tube having first and second axially spaced end portions, wherein the light emitting end of the diffuser is positioned within the first end portion of the tube, and a mirror positioned within the second end portion of the tube, the mirror having a light reflective surface facing the light emitting end of the diffuser, the mirror being axially spaced from the light emitting end of the diffuser, whereby light emitted from the diffuser is exposed to the tube before it reaches the reflective surface of the mirror.

2. The light assembly of claim 1 wherein the diffusing assembly deflects the light beam radially outwardly substantially 360 degrees around the axis.

3. The light assembly of claim 2 wherein the tube comprises a cylindrical glass tube having a ceramic phosphor coating.

4. The light assembly of claim 3 wherein the ceramic phosphor coating is on the inside cylindrical surface of the tube.

5. The light assembly of claim 3 further comprising a hollow Quartz glass sleeve surrounding the phosphor tube.

6. The light assembly of claim 1 wherein the tube is coated with phosphor.

7. The light assembly of claim 6 wherein the diffuser is comprised of glass and the mirror reflective surface is comprised of metal.

8. The light assembly of claim 1 wherein the light diffusing surface comprises a convex elliptical shape.

9. The light assembly of claim 1 wherein the light reflecting mirror surface is etched with a micro pattern.

10. The light assembly of claim 1 further comprising a second laser diode and a beam combiner for combining the light beam and a second light beam from a second laser diode into a substantially single beam.

11. The light assembly of claim 1 wherein the light diffusing surface comprises a concave elliptical shape.

12. The light assembly of claim 1 wherein the light entrance end of the diffuser has a planar surface extending generally perpendicular to the axis.

13. The light assembly of claim 1 further comprising an axially extending channel between the lens and the diffusing assembly.

14. A vehicle lighting assembly comprising a base, a laser diode mounted on the base, the laser diode for emitting a light beam along an axis, a diffusing assembly for deflecting the light beam at an angle to the axis, a lens positioned on the axis adjacent the laser diode, the lens axially spaced from the diffusing assembly, and a reflector for redirecting light deflected by the diffusing assembly, the diffusing assembly comprising:

an axially extending diffuser having a light entrance end and a light emitting end, the light emitting end having a reflective light diffusing surface, an axially extending tube having first and second axially spaced end portions, wherein the light emitting end of the diffuser is positioned within the first end portion of the tube, and a mirror positioned within the second end portion of the tube, the mirror having a light reflective surface facing the light emitting end of the diffuser, the mirror being axially spaced from the light emitting end of the diffuser whereby light emitted from the diffuser is exposed to the tube before it reaches the reflective surface of the mirror.

* * * * *